Oct. 26, 1943.  C. H. KLOSTERMAN  2,332,729
PORTABLE GRAIN CONVEYER
Filed Oct. 23, 1941  2 Sheets-Sheet 1
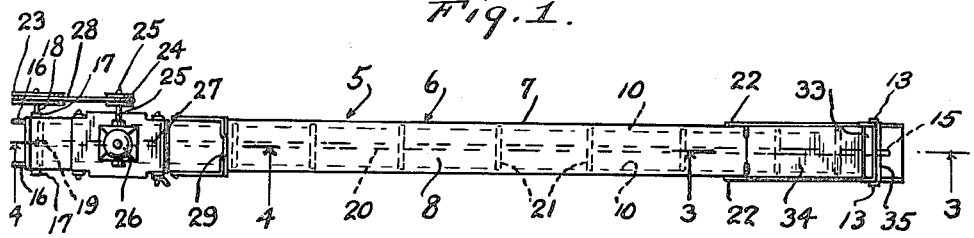
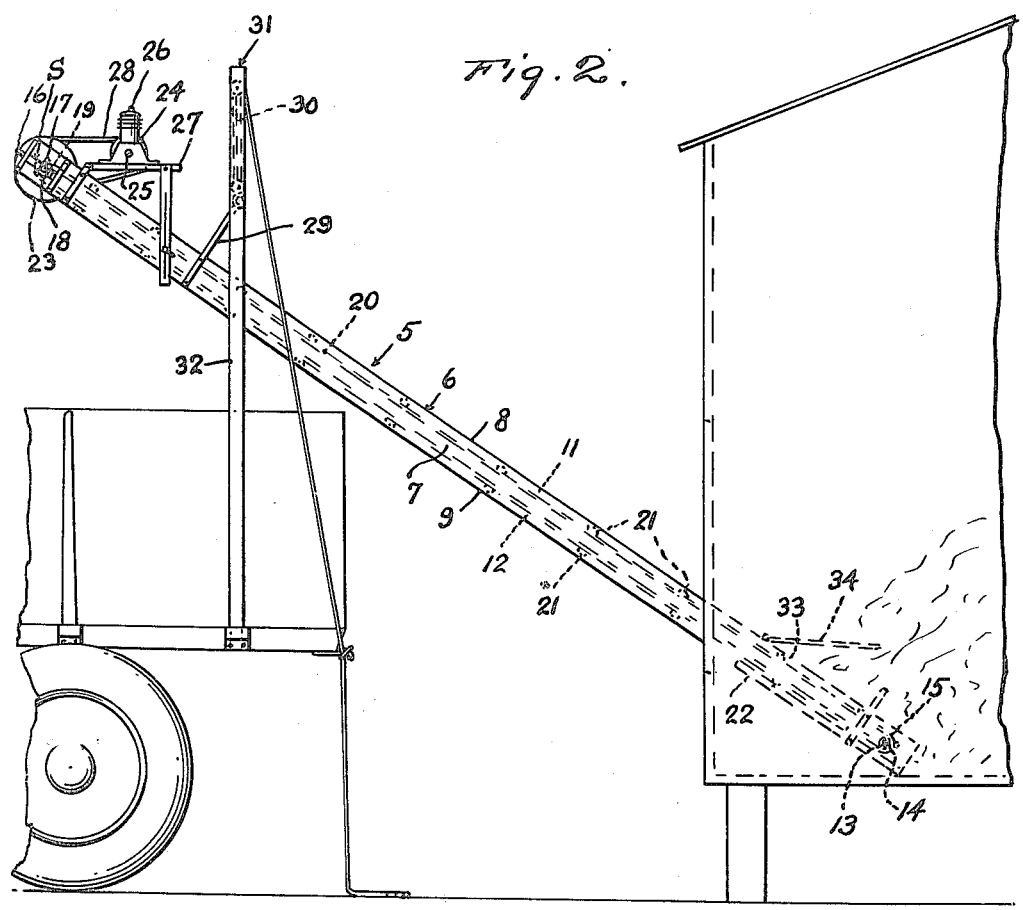
Inventor
Charles H. Klosterman Oct. 26, 1943.   C. H. KLOSTERMAN   2,332,729
PORTABLE GRAIN CONVEYER
Filed Oct. 23, 1941   2 Sheets-Sheet 2
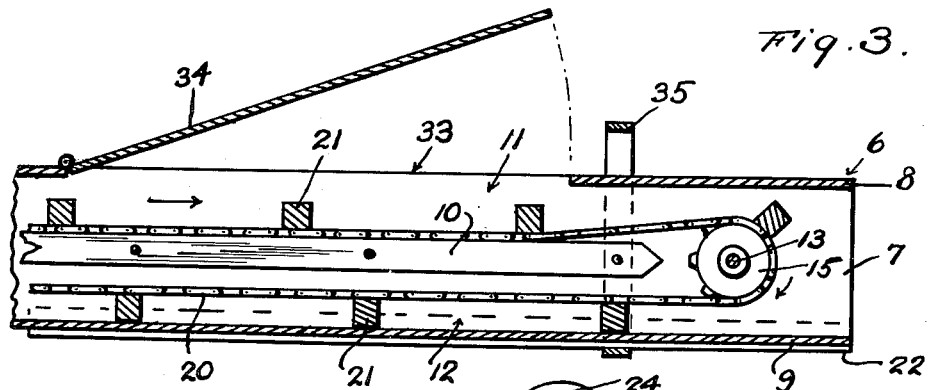
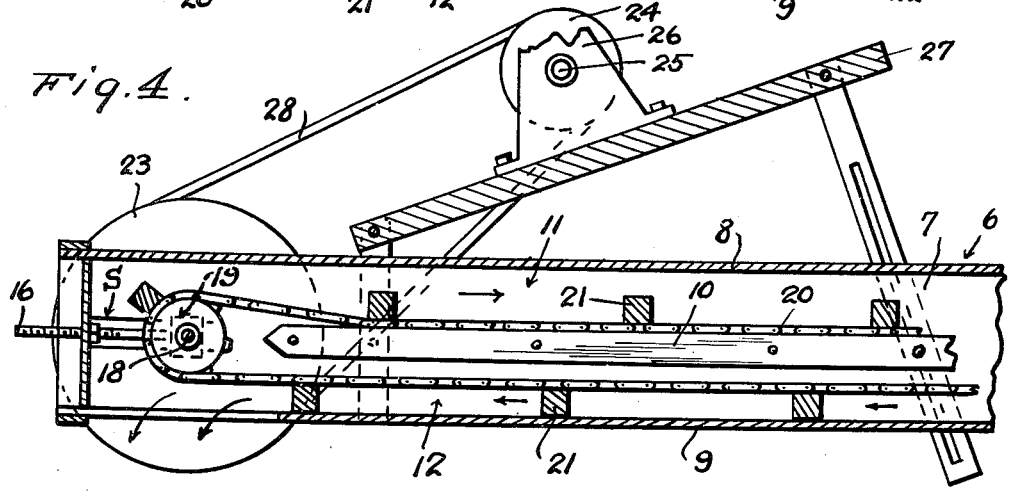
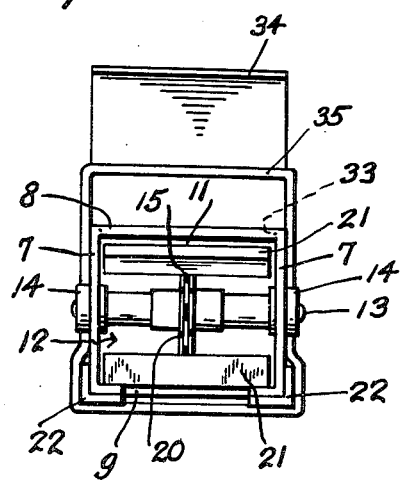
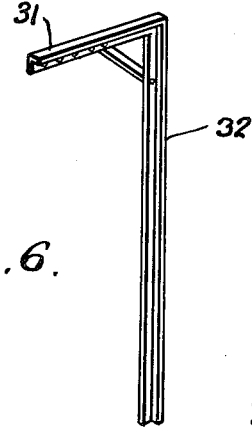
Inventor
Charles H. Klosterman
By L. B. James
Attorney

UNITED STATES PATENT OFFICE 2,332,729

PORTABLE GRAIN CONVEYER

Charles H. Klosterman, Elkton, S. Dak.

Application October 23, 1941, Serial No. 416,253

1 Claim. (Cl. 198—174)

This invention relates to the official class of material handling and loading and more particularly portable conveyers.

The primary object of this invention resides in the provision of a light and sturdy portable conveyer adapted to quickly load grain from a bin to a truck or vice versa at a small cost of operation.

Another object of this invention resides in the particular manner of supporting the conveyer in operative position.

A further object of this invention resides in the particular construction of the feed end of the conveyer.

A still further object of this invention resides in the manner of mounting the motor on the conveyer chute.

Aside from the aforesaid objects this invention resides in the particular manner of adjusting the conveyer chain.

With these and other objects in view this invention resides in certain novel features of construction and arrangement of elements to be hereinafter set forth in the specification, illustrated in the accompanying drawings and pointed out in the appended claim and, while this disclosure depicts my present conception of the invention, the right is reserved to resort to such changes in construction and arrangement of elements as come within the spirit of the invention.

In the accompanying drawings forming a part of this application:

Fig. 1 is a plan view of the conveyer.

Fig. 2 is a side view thereof.

Fig. 3 is an enlarged sectional view of the feed end of the conveyer taken approximately on line 3—3 of Fig. 1.

Fig. 4 is a similar view of the discharge end of the conveyer taken approximately on line 4—4 of Fig. 1.

Fig. 5 is an enlarged view of the feed end of the conveyer.

Fig. 6 is a perspective view of the conveyer supporting standard.

In the present illustration of this invention the numeral 5 designates, in general, a portable conveyer consisting of an elongated chute 6 preferably formed of sheet metal into substantially rectangular configuration and having closed sides 7, top 8 and bottom 9.

Secured to the inner surfaces of the sides in opposed relation are hardwood guide rails 10 forming upper and lower bucket traversing channels 11 and 12, the lower of which is utilized for conveying the grain from the lower or feed end of the chute to the discharge end thereof while the upper of which forms a guide for the blades returning to the feed end of the chute. The opposite ends of said guide rails terminate inwardly of shaft bearings to be hereinafter set forth.

Journalled in suitable bearings 13 secured to the sides of the chute and adjacent its feed end is a shaft 14 carrying an idle sprocket 15 disposed within the chute while adjustably disposed in the slots S in the sides of the chute at the opposite or discharge end thereof, as by a suitable chain tightner 16, are suitable bearings 17 in which is journalled a shaft 18 having a sprocket gear 19 splined thereon in longitudinal alignment with the aforesaid idler sprocket to accommodate an endless conveyer chain 20 for movement through the aforesaid upper and lower channels within the chute.

Spacedly secured to the chain 20 is a plurality of conveyer blades 21 which, while herein shown as being constructed from hardwood, may be formed of other material found appropriate in practicing this invention.

Suitably secured to the lower corners of the chute are angle-iron strips 22 which not only reinforce the feed end of the chute but form means for preventing wear or damage to that portion of the chute contacting the floors of bins and the like.

Splined on one end of the shaft 18 is a large pulley 23 which is aligned with a small pulley 24 on the drive shaft 25 of a suitable motor 26 mounted on an adjustable platform 27 supported above the chute adjacent its discharge end. Said pulleys are preferably connected by a V-shape belt 28. However it is within the purview of this invention to substitute any well known driving means between the motor and shaft 18 whereby the conveyer chain can be operated with equal results.

Although tightening and loosening of the belt 28 is herein obtained through adjustment of the motor supporting platform, it is to be understood other conventional means may be employed in carrying out said function where conditions demand that the motor to be otherwise mounted on the chute.

Secured to the chute adjacent its discharge end is a yoke 29 to which is connected one end of a block and fall 30 having its opposite end connected to a laterally extending arm 31 formed on the upper end of a standard 32 which in turn is removably supported on a truck body by one of the conventional stave brackets thereof or other similar means not shown.

Formed in the top wall of the chute adjacent its feed end is an elongated opening 33 having a hinged cover 34 thereover, the same being utilized not only to permit inspection of the conveyer chain but to allow rapid feeding of grain to the conveyer when open.

In order to permit the free end of the chute to be readily swung into various feeding positions relative to the bulk of grain to be moved, a suitable handle 35 is secured to the same adjacent the lower end thereof.

With a conveyer constructed in accordance with this invention, it is apparent that means are provided whereby grain can be quickly loaded and unloaded from bins and trucks regardless of their locality and, through the simplicity of the mechanism employed, positive operation thereof is ensured.

Having thus described my invention what I claim and desire to protect by Letters Patent is:

A portable grain conveyer comprising a substantially rectangular chute having an elongated opening in its top side adjacent its feed end, opposed guide rails secured within the chute on opposite sides thereof and in spaced relation to the bottom of the chute, laterally extending shafts journalled in the ends of the chute and adjacent the ends of said guide rails, aligned sprockets keyed to the central portions of the shafts, an endless conveyer chain trained over the sprockets, laterally extending blades secured to the conveyer chain at their central portions and having their ends slidably engaging the rails on their downward movement and their outer surfaces slidably engaging the bottom side of the chute on their upward movement, a cover disposed over the elongated opening in the chute, a hinge securing the upper end of the cover to the top side of the chute, a motor adjustably mounted over the top of the chute adjacent its discharge end, power transmitting means connecting the motor to the upper shaft of the conveyer chain, and means swingably supporting the upper end of the chute.

CHARLES H. KLOSTERMAN.